United States Patent Office 3,766,296
Patented Oct. 16, 1973

3,766,296
ADDUCTS OF TRIGLYCIDYL ISOCYANURATE
WITH NOVOLAKS ABLE TO FORM CROSS-
LINKS
Karl Heinz Kassner, Dusseldorf, Germany, assignor to
Henkel & Cie GmbH, Dusseldorf, Germany
No Drawing. Filed Mar. 20, 1972, Ser. No. 236,339
Claims priority, application Germany, Apr. 1, 1971,
P 21 15 854.3
Int. Cl. C08g 45/08
U.S. Cl. 260—831          9 Claims

ABSTRACT OF THE DISCLOSURE

Process for the preparation of adducts of triglycidyl isocyanurate and hardeners capable of cross-linking, and prepared by reacting crystallized triglycidyl isocyanurate with an epoxide oxygen content of at least 14%, with novolaks with the weight proportion 25:75 to 70:30 during 20 to 120 minutes at temperatures from 110 to 170° C.

PRIOR ART

The present invention relates to a process for preparing adducts, capable of cross-linking, from triglycidyl isocyanurate and hardeners for compounds, containing more than one epoxide, group in the molecule.

In U.S. Pat. No. 3,479,302 it is known to prepare hardenable mixtures from triglycidyl isocyanurate by admixing crystalline triglycidyl isocyanurate with a content of at least 14% of epoxide oxygen, with organic compounds capable of forming polyadducts with these epoxide compounds, in the amount required for hardening. Then this mixture is heated to a temperature range which causes that degree of reaction which lies between 15 and 30%. It is preferable to use aromatic amines or dicarboxylic acid anhydrides as polyadduct formers. Such preliminary reactions have the advantage of producing prereaction products which have a much greater solubility as compared with crystalline triglycidyl isocyanurate. These preliminary reactions, however, have the disadvantage that the storability is limited and that after a certain amount of time, these products become cross-linked even before the proper conditions for cross-linking have been achieved.

OBJECTS OF THE INVENTION

It is an object of the present invention to prepare adducts from triglycidylisocyanurate which are capable of cross-linking and that have a good solubility in organic solvents and simultaneously possess an improved storability.

It is another object of the present invention to provide a process for the preparation of adducts from triglycidyl isocyanurate having an epoxide oxygen content of at least 1% by weight and capable of being cross-linked which comprises the steps of reacting a crystalline triglycidyl isocyanurate having an epoxide oxygen content of at least 14% with novolaks in a weight ratio of 25:75 to 70:30 at a temperature from 110° C. to 170° C. for time from 20 to 120 minutes; and recovering said adducts.

It is a further object of the present invention to provide an adduct reaction product capable of cross-linking and produced by the above process.

Other and further objects of this invention will become apparent as the description thereof proceeds.

DESCRIPTION OF THE INVENTION

According to the invention, crystalline triglycidyl isocyanurate with an epoxide content of at least 14% is reacted with novolaks in the weight proportion 25:75 to 70:30 during 20 to 120 minutes at temperatures from 110° C. to 170° C. Preferably the triglycidyl isocyanurate is reacted with novolaks in the weight ratio 30:70 to 60:40 during 40 to 90 minutes at 120° C. to 150° C. At the end of this time the reaction mixture is quickly cooled to about room temperature to obtain adducts with at least 1%, preferably 3 to 6% epoxide oxygen content. These adducts have a particularly good solubility in organic solvents and have utility in the production of coatings and adhesives.

The present invention is directed to a process for the preparation of adducts from triglycidyl isocyanurate having an epoxide oxygen content of at least 1% by weight and capable of being cross-linked which comprises the steps of reacting a crystalline triglycidyl isocyanurate having an epoxide oxygen content of at least 14% with novolaks in a weight ratio of 25:75 to 70:30 at a temperature from 110° C. to 170° C. for a time from 20 to 120 minutes; and recovering said adducts.

The present invention also provides an adduct reaction product capable of cross-linking and produced by the above process.

As starting material for the preparation of the adducts which are capable of cross-linking, a pure crystalline triglycidyl isocyanurate is used. This can be produced, for example, according to U.S. Pat. 3,337,509. Generally a mixture of the two stereo-isomeric forms is used having the purity obtained from the technical production thereof. The term "novolak" as used herein is understood to mean the known phenolformaldehyde condensates which are soluble in ethanol or toluol. They are obtained by an acidic condensation of phenol and formaldehyde in the mol ratio from 2:1 to 1.6.

The reaction of the two reaction components of the present invention is appropriately affected in the melt. On occasion it is also possible to use appropriately high-boiling solvents, such as diacetone alcohol, ethylether of ethyleneglycol monoacetate and the like. Since the reaction conditions are influenced by the melting point of the novolak used as well as by the rate of heat exchange, depending upon the amount of the charge, the exact operating conditions have to be ascertained for each case. The reaction of the two components must be intercepted or initially terminated by quick cooling. The point in the reaction when the quick cooling has to begin is reached when a sample of the reaction product can just be dissolved in methylethylketone at room temperature without turbidity to give a 50% solution.

The reaction products obtained can be cross-linked with themselves alone by heating, and without the addition of hardeners. The reaction may be speeded up by the addition of primary amines, such as isopropylamine, dodecylamine and the like. Also these primary amines favorable influence the hardness or flexibility of the prepared molded bodies, as well as favorably influencing these cross-links in coatings or as cementing agents. As accelerators it is also suitable to use tertiary amines or quaternary ammonium compounds or dicyandiamide. In general these accelerators are used only in an amount of about 0.5% to about 5%, based on the reaction product.

The reaction products, according to the invention, can also be cross-linked with polyadduct formers, known for epoxide compounds or with substances initiating polymerization by ring opening.

To affect the cross-linking at room temperature polyvalent non-aromatic amines are particularly suitable. Examples of these compounds are the alkylenepolyamines such as ethylene diamine, propylene diamine, butylene diamine, diethylene triamine, triethylene tetramine, dimethylamino propylamine, diethylamino, propylamine; cycloalkylpolyamines such as diamino cyclohexane, diamino-4-ethyl cyclohexane, diaminodicyclo hexylmethane. Other suitable agents are polyamides, containing free amino groups, particularly the reaction products from dimerized fatty acids and polyamines, which can also contain imidazolidine rings as well as free amino groups. The hardening requires about 2 to 24 hours, whereby approximately one amino hydrogen should be allotted to an epoxide group.

To affect the hardening process at elevated temperature, aromatic amines or carboxylic acid anhydrides are preferable as epoxide hardening agents. Preferably polyvalent aromatic amines having at least two —NH$_2$ groups in the molecule are used, for example, 4,4'-diaminodiphenylmethane, 4,4'-diamino - 3,3'-dimethoxydiphenylmethane, 4,4'-diamino-3,3'-dichlorodiphenylmethane, 4,4'-diamino-3,3',5,5-tetrabromodiphenylmethane, 4, 4'-diaminodiphenyl oxide, diaminodiphenyl sulfite, diaminodiphenyl oxide, diaminodiphenyl sulfite, diaminodiphenyl sulfone, the isomeric phenylenediamines, benzidine, hydroxypropyl-m-phenylenediamine. Condensates from aniline with formaldehyde are also usable. The amount of the amines to be used should be measured so that there is allotted for one epoxide group 0.4 to 1.2, particularly 0.6 to 1.0, of reactive aminohydrogen.

Another preferred group of polyadduct components for the cross-linking at elevated temperatures comprises organic polycarboxylic acid anhydrides and particularly organic dicarboxylic acid anhydrides. Examples of these anhydrides include hexahydrophthalic acid anhydride, tetrahydrophthalic acid anhydride, phthalic acid anhydride, methylcyclohexane dicarboxylic acid anhydride, dodecenylsuccinic acid anhydride, pyromellitic acid anhydride, endomethylenetetrahydrophthalic acid anhydride, methylenedomethylenetetrahydrophthalic acid anhydride and others. The amount of the carboxylic acid anhydride to be used should be measured so that from hydride, endomethylenetetrahydrophthalic acid anhydride 0.6 to 1.2, preferably 0.8 to 0.9 carboxylic acid anhydride groups are alloted to each epoxide group in the molecule of the triglycidyl isocyanurate novolak adduct.

The reaction products capable of being prepared according to the invention can be advantageously used for the production of coatings. To utilize these reaction products, they are applied to the base substrates to be coated. Usually these products are dissolved in relatively low boiling organic solvents, such as methylene chloride, acetone, butanone, ethyl acetate, methylisobutylketone, butyl acetate, ethyleneglycol diethylether, ethylether of the ethyleneglycol monoacetate, diacetone alcohol. After the evaporation of the solvent, the coatings are appropriately hardened by heating to about 100° C. to 150° C. during ½ to 4 hours.

Furthermore, it is possible to produce heat-stable cementings as laminates with the reaction products of the invention. For this purpose the adducts are appropriately applied in solution to the surfaces to be cemented together. Optionally they may be applied together with a hardener or accelerator. Subsequently after the evaporation of the solvent, the laminatable structures are heated to the temperatures required for hardening. The adducts can also be applied in powder form, optionally with a powdered cross-linking agent, to the surfaces to be cemented together. Generally it is sufficient to heat for ½ to 1 hour at temperatures from 130° C. to 180° C. The reaction products of the invention can also be used for the preparation of insulating varnish, stable to soldering. They are furthermore suitable for the electrostatic powder coatings or for the preparation of coatings by the whirl-sintering process.

The adducts from triglycidyl isocyanurate capable of being prepared according to the invention have very good storability. In storing these adducts for about one year, no decrease of the solubility could be observed. The adducts of the invention are quite compatible with many adhesive and lacquer raw materials. Thus they may be combined with urea resins, melamine resins, phenolic resins, vinyl esters or acrylic ester, containing reactive groups, or silicon resins, containing reactive groups. By being combined with the above-named raw materials, the properties of the coatings or cementing may be varied, as desired.

The following examples are merely illustrative of the invention without being limitative in any manner.

All percentages in the following examples, in the specification and in the claims are percentages by weight.

Example 1

100 gm. of novolak were produced by heating of 2 mols of phenol with 1.5 mols of 37% aqueous formaldehyde solution and with 0.2 gm. of oxalic acid at 90° C. during 3 hours followed by a subsequent dehydration by heating to 140° C. for 4 hours. The 100 gm. of novolak were admixed with 100 gm. of triglycidyl isocyanurate (epoxide oxygen content 14.5%) after having been melted at 140° C. This mixture was maintained for 40 minutes at 140° C. while slowly being stirred. Then the melt was quickly cooled to about room temperature and after cooling was pulverized.

The reaction product had an epoxide oxygen content of 4.8%. From the reaction product 50% solutions in the following solvents could be prepared: methylene chloride, acetone, butanone, ethyl acetate, methylisobutylketone, butyl acetate, cyclohexanone, ethyleneglycol, diethylether, ethyl ether of ethyleneglycol monoacetate, diacetone alcohol.

The reaction product was, however, practically insoluble in alcohols and aromatic and aliphatic hydrocarbons.

For the preparation of coatings, a 30% solution in butanone was made. Then into this solution sheets of copper, iron and aluminum having the dimensions 15 x 7 cm. were dipped. After the solvent had been evaporated, the sheets were baked at 120° C. for 2 hours. The coatings were not acetone soluble.

The quality of the surface was determined after tempering at 250° C. for 20 hours by the cross hatch test in accordance German industrial standard DIN 53 151. In all cases a very good mark resulted (grade 1). When the coated sheets were subjected to stronger thermal stress, only a brownish coloration appeared without impairing the adhesion or luster of the coating.

Example 2

100 gm. of the product, obtained by Example 1, were dissolved together with 10 gm. of ethylenediamine in butanone to form a solution with a 20% solid content.

With this solution sheets of aluminum, copper, iron and wood were coated. After evaporation of the solvent, the coatings were allowed to harden for 12 hours at room temperature.

Hard and shockproof coatings had thereby been formed, which were then examined for their surface quality on the named metals by the cross hatch test. In all cases an unobjectionable cross hatch (grade 0 to 1) was observed.

Example 3

A 25% solution of the addition product, according to Example 1, was prepared in acetone. With this solution, hard aluminum sheets, of the dimensions 2.5 x 10 x 0.2 cm. were coated. After the evaporation of the solvent these coated sheets were put above each other, overlapping at the ends. The cemented laminates were hardened at a pressure of about 0.05 kp./cm.² for 1 hour at 150° C.

Subsequently the tensile shearing strength was determined, which was between 0.85 to 0.95 kp./mm. for all the sheets.

After heating to 150° C., no decrease of the tensile shearing strength took place in the sheets.

Example 4

A mixture of 100 gm. of novolak having a melting range between 108 to 118° C. (Alnovol® PN 800 of Reicholt-Albert-Chemie) and 80 gm. of triglycidyl isocyanurate (epoxide oxygen content 14.4%) was heated to 130° C. and maintained at this temperature for 50 minutes. Then the melt was cooled and pulverized.

The reaction product had an epoxide oxygen content of 4.5%. It could be dissolved in acetone to give an entirely clear 50% solution.

100 gm. of the crushed addition product and 18 gm. of phthalic acid anhydride were dissolved in 300 gm. of methylethylketone. Sheets of copper, steel and aluminum were dipped into this solution. After evaporation of the solvent the sheets were baked at 140° C. for 30 minutes.

The resulting transparent coatings showed good adhesion. In the cross hatch test grades from 0 to 1 were observed.

Example 5

A mixture of 100 gm. novolak having a melting range between 75 and 83° C. (Alnovol® K 320 of Reichholt-Albert-Chemie) and 120 gm. triglycidyl isocyanurate (epoxide oxygen content 14.7%) was heated to 120° C. and maintained at this temperature for 60 minutes. Thereafter the melt was cooled and pulverized.

The reaction product had an epoxide oxygen content of 5.5%. It dissolved in acetone as well as in methylethylketone to give clear 50% solutions.

100 gm. of this addition product and 12 gm. of 4,4'-diaminodiphenylmethane were dissolved in 400 gm. of ethyl ether of ethyleneglycol monoacetate. Copper sheets were dipped into this solution. After evaporation of the solvent the sheets were heated to 120° C. for 60 minutes.

Thus transparent coatings were obtained which adhered strongly to the copper surface. The coatings showed an unobjectionable cross hatch (grade 0 to 1). No embrittlement of the coatings occured when the coated sheets were exposed to a temperature of 250° C. during 15 minutes. The cross hatch test remained unchanged (grade 0 to 1).

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

I claim:

1. A process for the preparation of adducts from triglycidyl isocyanurate having an epoxide oxygen content of at least 1% by weight and capable of being cross-linked which comprises the steps of reacting a crystalline triglycidyl isocyanurate having an epoxide oxygen content of at least 14% with novolaks in a weight ratio of 25:75 to 70:30 at a temperaure from 110° C. to 170° C. for a time from 20 to 120 minutes, and recovering said adducts.

2. The process of claim 1 in which the isocyanurate adduct from triglycidyl isocyanurate has an epoxide oxygen content of from 3 to 6% and is capable of being cross-linked.

3. The process of claim 1 in which the crystalline triglycidyl isocyanurate is reacted with novolaks in the weight proportion of 30:70 to 60:40 at a temperature from 120° C. to 150° C. for a time from 40 to 90 minutes.

4. A process for the production of coated articles comprising applying to a coatable substrate, the adducts prepared by the process of claim 1 and cross-linking the said adducts.

5. A process for the production of laminated articles comprising interposing between adjacent surfaces of at least two articles, the aducts prepared by the process of claim 1 and cross-linking the said adducts.

6. The process of claim 4 in which the adducts are cross-linked by heating to an elevated temperature.

7. The process of claim 4 in which the adducts are cross-linked at an elevated temperature with an epoxide resin hardener selected from the group consisting of aromatic amines having at least two —$NH_2$ groups in the molecule and organic polycarboxylic acid anhydrides.

8. The process of claim 4 in which the adducts are cross-linked at room temperature with a polyvalent aliphatic amine epoxide resin hardener.

9. An adduct reaction product capable of cross-linking produced by the process of claim 1.

References Cited
UNITED STATES PATENTS

| | | | |
|---|---|---|---|
| 3,496,122 | 2/1970 | Niklaus | 260—831 |
| 3,632,665 | 1/1972 | Aggias | 260—831 |

PAUL LIEBERMAN, Primary Examiner

U.S. Cl. X.R.

117—132 BE; 260—2 EN, 18 Ep, 31.2 T, 31.4 Ep, 32.8 Ep, 33.4 Ep, 33.8 Ep